United States Patent [19]

Brewer et al.

[11] 3,791,270

[45] Feb. 12, 1974

[54] PROCESS FOR ACCURATELY MARKING PRECISE RECTANGULAR AREAS

[75] Inventors: George R. Brewer, Malibu; Russell R. Law, Pacific Palisades, both of Calif.

[73] Assignee: Hughes Aircraft Company, Culver City, Calif.

[22] Filed: May 23, 1968

[21] Appl. No.: 731,497

[52] U.S. Cl. .......... 95/1, 33/41

[51] Int. Cl. .......... B43l 13/02

[58] Field of Search ....... 355/109, 111; 33/41; 95/1; 29/527.2

[56] References Cited

UNITED STATES PATENTS

| | | | |
|---|---|---|---|
| 2,862,300 | 12/1958 | Maurer | 33/41 |
| 2,991,705 | 7/1961 | Bryan | 355/109 |
| 3,215,054 | 11/1965 | Hamilton | 355/109 |
| 3,298,297 | 1/1967 | Carlson | 355/111 |
| 3,313,223 | 4/1967 | Frantzen | 95/1 |
| 3,445,921 | 5/1969 | Leenhouts | 29/527.2 |

*Primary Examiner*—John M. Horan
*Attorney, Agent, or Firm*—W. H. MacAllister; Allen A. Dicke, Jr.

[57] ABSTRACT

Precise rectangular areas are marked upon a photosensitive substrate by means of an accurate mask. The mask is produced by axially scribing an opaquely metalized quartz tube on its outer, circumferential surface with equally spaced scribe marks through the opaque metallization and circumferentially scribing the quartz tube with equally spaced circumferential marks through the opaque metallization. These two sets of scribed marks produce rectangular areas on the cylinder. The cylinder is rolled in contact with a photosensitive medium, with illumination being supplied from the inside of the quartz tube. Thus, the accurately scribed marks are transferred to the medium, and particularly to a fairly long medium which is not limited by the circumference of the quartz tube.

1 Claim, 4 Drawing Figures

PROCESS FOR ACCURATELY MARKING PRECISE RECTANGULAR AREAS

BACKGROUND

This invention is directed to a process for accurately marking rectangular areas.

With the development of microminiaturized equipment, it has become more important to be able to very accurately define small rectangular areas. One technological area in which such developments are useful is the field of electrostatic storage of information, with the information being stored in the form of electrostatic charges. Many small electrostatically chargeable areas are necessary to provide for dense information storage. Thus, the definition of small areas is essential. Furthermore, these areas must be exactly positioned because the information must be retrievable by touching a conductor to the surface to detect the charge, or positioning a capacitor plate adjacent any outlined area to detect the charge. Without accurate positioning, the wrong rectangle, or perhaps two adjacent rectangles may be sensed with the resultant chance of obtaining inaccurate response from the memory storage.

An adequate accuracy is obtainable from a rectangularly scribed grid which can be used as a mask for exposure of the number of areas defined by the grid. However, the repositioning of the grid adjacent the first exposed area so that the exposure through the grid in its second position is accurately related to the first exposure is virtually impossible. Of course these two positionings of the grid upon the photosensitive surface must be accurately related, or the adjoining areas will be improperly joined. As a matter of practice, such joining is virtually impossible to obtain in practice, with a result that the areas which can be defined with sufficient preciseness and accuracy are limited to those which can be exposed through one grid. Of course, the size of such a grid that can be accurately prepared is also limited so that size limitations have been inherent from the prior art methods of production.

SUMMARY

For ease of understanding, it can be stated in essentially summary form that this invention is directed to a process for accurately marking precise rectangular areas upon a substrate. The marking is accomplished by using a cylindrical marking device, which is opaque except for accurately spaced circumferential and axial marks. The axial marks are spaced in such a manner that an integral number of equal divisions are spaced around the circumference. This in turn is accomplished by rotating the cylinder through a number of integral equally spaced division spaces so as to be substantially equal to pi times the diameter of the cylinder. Inspection determines whether or not this integral number does indeed equal pi times the diameter. Adjustments are made in the length of each of the divisions so that with a new length of such divisions, the integral number does indeed equal the product of pi times the cylinder diameter. Thereupon, the individual axial marks are made through an opaque coating on the cylinder, each spaced by such a division so that an integral number of equal divisions are accomplished around the circumference. The marks substantially extend from end to end of the cylinder.

The cylinder is also marked with equally spaced circumferential marks so that rectangular areas are defined. Thereafter, the cylinder is rolled against the photosensitive medium with exposure of the marks onto the photosensitive medium so that a continuous grid of equally spaced lines are exposed onto the photosensitive medium. From this, through photoresist techniques, plating techniques and the like, a large number of equal areas are defined.

Accordingly, it is an object of this invention to provide a process for accurately marking precise rectangular areas over a large area. It is a further object of this invention to precisely mark the rectangular areas by rolling an accurately marked cylinder upon a sensitive medium so that the accurate marks on the cylinder are transferred to the sensitive medium, and the cylinder can be rolled upon the sensitive medium for the entire length of the sensitive medium to define a large area. It is a further object of this invention to accurately mark equally spaced axial lines upon the outer surface of the cylinder. It is a further object to accomplish such equal spacing around the circumference by first testing to determine whether or not a plurality of equal spaces of predetermined size are equal to pi times the diameter, and correcting the predetermined space so that an integral number of such spaces extend around the cylinder. Other objects and advantages of this invention will become apparent from a study of the following portion of the specification, the claims and the attached drawings.

DESCRIPTION

The process of this invention results in a marking device 10 which is in the form of a tube having an interior bore 12 and having markings on the exterior cylindrical surface 14 of the tube. The exterior cylindrical surface 14 is precision formed. Marking device 10 has an opaque outer layer, preferably a thin metalized layer, thereon, through which the markings extend. Preferably the tube which forms marking device 10 is made of transparent material so that exposures can be made by means of a light source interior of the tube to a sensitive surface exteriorly of the tube. In view of the desired accuracy, quartz or other material of low coefficient of thermal expansion is preferred.

Figure 3:
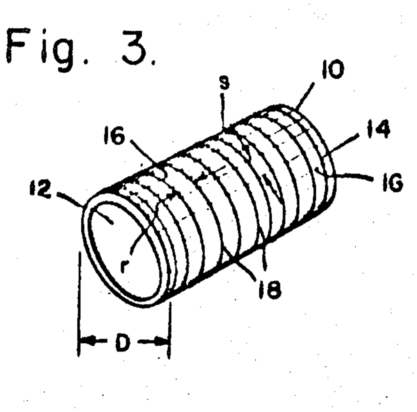
FIG. 3 is an isometric view of the complete cylinder.

The exposure is of the markings on the exterior of the tube. The markings are illustrated in FIG. 3 by longitudinal, axial scribe marks 16 which are separated by a circumferential distance "s". The marks 16 are spaced such that the distance "s" between each of the axial marks 16 is equal. This requires that the number of marks times the distance "s" is equal to pi times the diameter D. The manner in which this equality is produced is described hereinbelow.

Additionally, marking device 10 carries circumferential marks 18 therearound, which marks are equally spaced along the axial length of the marking device, with each of the adjacent circumferential marks separated by an equal distance "r". The distance "r" may equal the distance "s", and their sizes are related to the end use of the article produced by the marking device 10.

Figure 1:
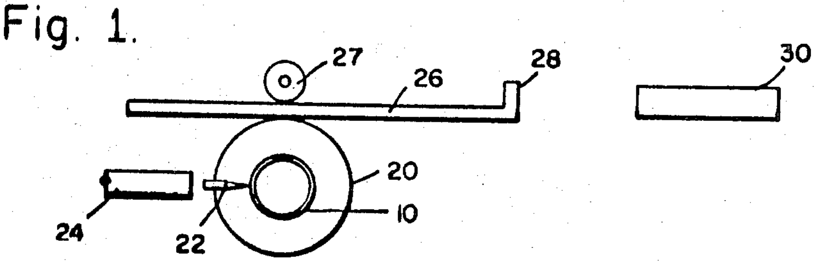
FIG. 1 is a schematic end elevational view of a cylinder being marked, schematically showing the equipment involved therewith to mark a plurality of equally spaced axial lines upon the outer circumference of the cylinder.

Referring to FIG. 1, the marking device 10 is illustrated as having a friction drive wheel 20 fixed thereto. Furthermore, scriber 22 is mounted so as to scribe an axial line or mark 16 along the length of marking device 10, through its opaque metalized outer coating. Microscope 24 is positioned to view the position of the first scribed line along the axial length of the outer surface of marking device 10.

Driver 26 is in friction drive engagement with drive wheel 20, and is arranged for longitudinal motion along its own length. It can be moved from position to position along its own length, and be locked in any desired position. When it is so moved, it rotates drive wheel 20 and marking device 10 fixed thereto. Press roll 27 aids in preventing slippage. Thus, the axial position of driver 26 along its own length is directly related to the rotary position of marking device 10 with respect to scriber 22 and microscope 24.

Diver 26 carries mirror 28 on its end. Laser interferometer 30 is axially aligned with the direction of motion of driver 26 and is directed at mirror 28. Laser interferometer 30 thus serves as a very accurate gauge for setting the position of driver 26 along its length.

As a first step of the process, the equipment is set up as shown in FIG. 1, and scriber 22 is axially moved to scribe an axial line 16 along the length of marking device 10 through its opaque coating. Thereupon, microscope 24 is positioned to be directed at the fist scribed line 16. Next, driver 26 is moved along its length for such a distance that "*n*" number of spaces "*s*" around the circumference are passed under microscope 24. The axial distance that the driver 26 moves, to accomplish rotation of marking device 10 through a circumference of *n* times s is accurately determined by means of the laser interferometer. Whether or not this circumferential distance of *n* times *s* is equal to pi times D is determined by inspecting the position of the first scribed line 16 through microscope 24.

It is expected that upon the first attempt, *n* times s will not equal pi times D. Thus the first scribed line 16 will not lie again under the microscope. In order to correct this, it is necessary to adjust the dimension s to a larger or smaller value, whichever is more convenient, so that the space between the first and last lines 16 is equal to *s*. A proportional adjustment is accomplished by changing the temperature of drive wheel 20. Since the linear distance moved by driver 26 is the same, and changing the temperature of drive wheel 20 results in its expansion or contraction, with resultant increase or decrease of its circumference, the distance s is slightly changed in dimension. It is more convenient to use a separate drive wheel 20, rather than have the driver 26 operate directly upon the surface of marking device 10. This is because it is desirable that marking device 10 have a minimum temperature expansion coefficient in order to maintain its stability. On the other hand, drive wheel 20 can have any desired available temperature coefficient of expansion so that the length of its circumference can be conveniently adjusted.

After a new temperature of drive wheel 20 has been established and stabilized, driver 26 is again stroked the number of multiples *n* of the new space s from the zero starting position wherein the first scribed line is under microscope 24. Again, it is determined whether or not *n* times *s* is equal to pi times D by inspecting the first line to determine whether or not the marking device 10 has made a full revolution and the first mark 16 is again directly under the microscope. Assuming that the temperature change of drive wheel 20 has made the proper correction, the first line 16 will again be under the microscope. Now, driver 26 is stroked in increments measured by laser interferometer 30 such that the outer surface 14 is moved the new distance *s*. Thereupon, scriber 22 is used to scribe a new line 16 through the opaque coating on the cylinder. This is repeated until all of the axial lines 16 have been scribed and now the last line 16 is spaced the distance *s* from the first line 16. In order to achieve the desired accuracy, at least wheel 20 is carefully temperature controlled.

Figure 2:
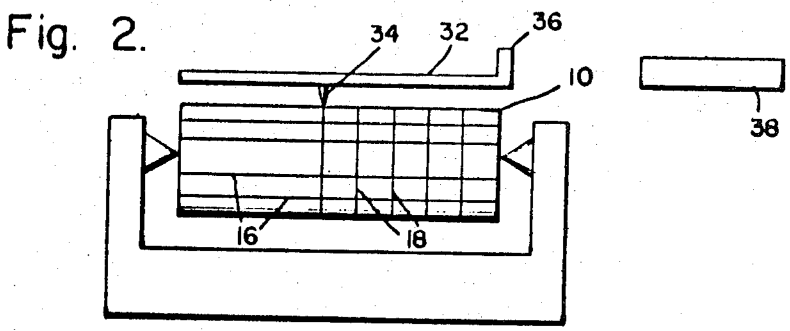
FIG. 2 is a side elvational view of a schematic apparatus showing the manner in which equally spaced circumferential lines are marked upon the cylinder.

This scribing is adequate if it is desired that a number of parallel spaced lines be marked. However, if precise rectangular areas are to be marked, it is necessary to mark around the circumference of marking device 10. To accomplish this, marking device 10 is mounted upon suitable bearings for rotation about its own axis, as is indicated in FIG. 2. Slide 32 carries circumferential scriber 34 thereon. Similarly to the structure described with respect to FIG. 1, slide 32 carries a mirror 36 thereon which cooperates with laser interferometer 38. Circumferential scriber 34 is moved to an accurately defined position axially of marking device 10 as determined by the interferometer laser, and thereupon marking device 10 is rotated to scribe a circumferential line 18 through the opaque coating on the cylinder. Thereupon, scriber 34 is accurately repositioned a distance *r* so that upon rotation of the device 10, another line 8 is scribed around the circumference a distance *r* from the first one. This is repeated until all of the lines 18 are scribed. Thus, precise rectangular areas are accurately marked upon the outer surface of device 10. Without limiting the process accomplishing this precise marking, for the illustrated purpose of marking electrostatic charge units upon a sensitive medium, the scribed marks are preferably approximately one to five microns in width, while the distances *r* and *s* are respectively in the order of five to twenty-five microns.

Figure 4:
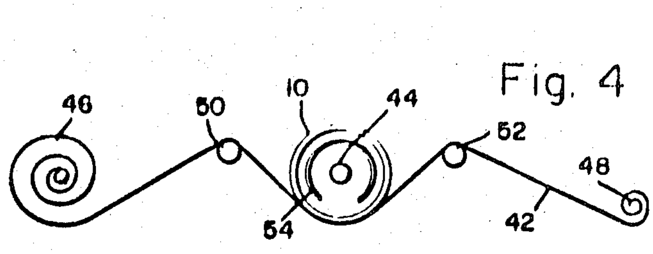
FIG. 4 is a schematic end elevational view showing the accurately marked cylinder being used to expose a sensitive medium of substantial length.

Referring to FIG. 4, in use the device 10 is positioned in association with guide rolls 40 and 41 which hold a portion of sensitive material 42 wrapped around a portion of the outer circumferential surface of device 10. Light source 44 is positioned within the tubular body marking device 10. When sensitive material 42 is photosensitive, source 44 is an ordinary light source for exposure of the sensitive material through marking device 10. In order to assure that only that portion of the sensitive material 42 which is held close to the surface of the marking is exposed, combined reflector and slit shutter 46 embraces lamp 44, except for a slit directed toward the portion of material 42 wrapped around the cylinder. Thus, exposure is limited to those areas of the sensitive material 42 which are closely adjacent to the outer surface of marking device 10. The sensitive material 42 is moved past device 10 from constant tension letoff 46 to constant tension takeup 48 by means of capstan 50. In addition, guide roll 52 maintains the proper amount of wrap of material 42 around device 10. Marking device 10 is freely rotatably mounted so that the device rotates with material 42 without slipping.

After exposure, the sensitive material 42 is suitably treated in accordance with its characteristics, preferably including development of the sensitive material and subsequent etching away of the unexposed areas which correspond to lines 16 and 18 on the marking device. The preferred sensitive material 42 is photosensitively coated metalized "Mylar". Thus, a length of sensitive material 42 of indefinite length can be treated so that a large area of accurately marked precise rectangular areas can be determined.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. The process for marking precisely separated axial lines comprising the steps of:

positioning a substantially cylindrical surface for the marking of axially directed lines on the surface;

marking an axially directed line upon the surface;

positioning an inspection device to indicate the position of the first marked axially directed line upon the cylindrical surface;

rotating the cylindrical surface a discrete number of increments of circumferential distance by causing linear motion of a driver operating upon a drive wheel which has a temperature coefficient of expansion other than zero so that the first marked axially directed line is rotated from the inspection point substantially a full revolution substantially back to the inspection point;

inspecting the position of the first marked axially directed line with respect to the inspection point;

correcting the length of each of the equal discrete increments by adjusting the circumferential length of the discrete increments by changing the circumferential length of the drive wheel by changing the temperature of the drive wheel so that the corrected length times the number of discrete increments equals the circumference of the cylinder; and scribing an axially directed line after rotating each discrete increment so that a plurality of axially directed lines are marked around the circumference of the cylinder, which lines are separated by equal discrete increments.

* * * * *